United States Patent [19]

Wells

[11] 4,448,117
[45] May 15, 1984

[54] HUMPBACK OVEN-BROILER

[75] Inventor: Harold D. Wells, St. Louis County, Mo.

[73] Assignee: Pet Incorporated, St. Louis, Mo.

[21] Appl. No.: 516,868

[22] Filed: Jul. 25, 1983

Related U.S. Application Data

[63] Continuation of Ser. No. 380,552, May 21, 1982, abandoned.

[51] Int. Cl.³ ............................................. A47J 27/62
[52] U.S. Cl. ...................................... 99/331; 99/386; 99/401; 99/443 C; 99/446; 126/19 R; 219/388; 432/152
[58] Field of Search ............. 99/331, 386, 401, 443 C, 99/446, 447; 126/19 R, 21 R; 219/388, 400, 345; 432/152

[56] References Cited

U.S. PATENT DOCUMENTS

| | | | |
|---|---|---|---|
| 3,809,859 | 5/1974 | Wells | 219/345 |
| 3,823,660 | 7/1974 | Nerthling | 99/386 |
| 4,008,996 | 2/1977 | Wells | 126/19 R X |
| 4,152,631 | 5/1979 | Weinberg | 318/314 |
| 4,167,585 | 9/1979 | Caridis | 99/446 |
| 4,245,613 | 1/1981 | Wells et al. | 126/19 R |
| 4,366,177 | 12/1982 | Wells et al. | 99/443 C X |

FOREIGN PATENT DOCUMENTS 2843547  4/1979  Fed. Rep. of Germany ...... 219/388

Primary Examiner—Billy J. Wilhite
Attorney, Agent, or Firm—Kalish & Gilster

[57] ABSTRACT

A tunnel oven-broiler wherein food products of ordinarily flame-producing character such as steaks, chops or other greasy meats prone to burn or produce flame are broiled in a flame-controlled manner. In a tubular, tunnel-form heating chamber with a conveyor food products are broiled by direct infrared emission from the interior chamber surfaces, heated to a predetermined emission temperature which is maintained by direct, intimate temperature probe contact with the exterior surface of the tubular chamber surrounded by electrical heating panel elements. An outer tubular member surrounds the heating element. Downwardly angled end sections extend from opposite ends of the oven to define the entrance and exit to the chamber. The entrance and exit are open at all times except when plugged during self-cleaning and are lower than the heating chamber to provide an oxygen-starved atmosphere therein having a slight overpressure for suppressing flaming or flaring during broiling. Inclined conveyor reaches within the end sections transport food products to and from the chamber at an angle of from 25°–40° relative to horizontal. Opposite ends of the heating chamber are selectively vented to atmosphere for control of the oxygen-starving chamber atmosphere. Drain outlet openings extend along the length of the bottom of the chamber to remove grease before it can contribute substantially to combustion therein.

11 Claims, 8 Drawing Figures

HUMPBACK OVEN-BROILER

This application is a continuation of application Ser. No. 380,552, filed May 21, 1982 now abandoned.

DESCRIPTION AND SUMMARY OF THE INVENTION

The invention relates to an improved tunnel oven-broiler of the humpback type.

It has come to be expected in restaurant, industrial, and institutional cooking that greasy foods such as hamburgers, steaks, chops, etc. will tend to flare up and char as grease rendered by the food catches on fire, as will occur when exposed to temperatures sufficient for broiling, for example. This is particularly so for beef, pork, and lamb but also occurs with fowl, including chicken, turkey, and duck.

Avoiding such flaming or flaring up of greasy foods is rendered extremely difficult since meat grease, for example, may begin vaporizing at only about 150° F. Therefore, the exposure of grease vapors to even the modest temperature present in broilers is likely to produce combustion.

One unfortunate aspect of such flaring or flaming of meat and grease in an oven or broiler is difficulty, if not impossibility, of accurately maintaining temperature control. This is because the flames and flaring up cause improper response by temperature sensing elements not indicative of the true temperature in the oven and irrespective of the absorption of heat by the food products. Thus, temperature sensing devices employed for temperature control are then no longer responsive to the cooking process but instead respond only to flaming and flaring. Temperature control is then lost resulting in entirely uncontrolled, uneven and often quite unpredictable broiling. These problems beset the fast food industry, especially high volume hamburger and steak restaurants.

Further, there is now research data tending to suggest that burning and exposure of food products to direct flame may cause conversion of their organic constituents, food additives, or preservatives to carcinogens.

An infrared type of oven, known as a humpback oven, for overcoming these difficulties has been developed. Such an oven is described and claimed in U.S. application Ser. No. 228,278, now U.S. Pat. No. 4,366,177, of Harold D. Wells et al and constitutes a departure from the conventional type of tunnel oven which has been utilized for a number of years in the fast food and industrial cooking field such as disclosed, for example, in Wells U.S. Pat. No. 4,008,996 and Wells U.S. application Ser. No. 956,869, now U.S. Pat. No. 4,245,613, wherein cooking is effected by infrared emission from hearth and roof panels located within the tunnel, as distinct from the pressure of heating elements per se from which emission is directly made as has been utilized for domestic and industrial cooking for many years. Tunnel ovens of this type wherein the interior of the tunnel defines the radiating surfaces from which emanate infrared emission for being received by food products carried through the tunnel, have provided a way of cooking which has revolutionized the food service industry since it preserves the taste, succulence and moisture of food products.

In the above-described humpback oven, greasy meats can be cooked in a substantially flameless method since the oven chamber geometry is such that an oxygen-starved tunnel atmosphere is trapped within the tunnel oven and substantially prevents the burning or flaming of the food products while they are heated by the emission of infrared radiation from the surfaces of the tunnel oven chamber.

An unexpected problem which has been discovered with this totally flameless cooking method is that the atmosphere, being totally entrapped, tends over a period of time to become saturated with grease vapors and smoky constituents of the broiling process. As a consequence, the introduction of uncooked articles of meat entering the oven results in condensation on the relatively cold meat surfaces of grease vapor and smoky products of the broiling process such that an undesirable taste can be imparted to the cooked product.

In accordance with the present invention, it has now been found that a certain amount of slight but very tightly controlled grease combustion in a tunnel oven-broiler can be permitted since it provides conversion or oxidizing reaction with vapor or smoke constituents in the atmosphere within the oven tunnel to prevent same from being deposited on the meat.

An object of the present invention is to provide an improved infrared tunnel oven-broiler of the humpback type, hereinafter referred to as a tunnel oven.

It is an object of the present invention to provide such a tunnel oven-broiler of broiling which makes possible the cooking of greasy food products such as steaks and chops without excessive burning, flaring or undesirable exposure of the meat to the impingement of flame.

An object of the present invention is the provision of such a tunnel oven-broiler of broiling which provides oxygen-starved cooking of food products to minimize burning of grease, volatile constituents of the cooking process and the food product to prevent undesirable flaring, flaming, grease fires, and the like; it being also an object of the invention to provide such a tunnel oven of cooking in which any minimal flaring or flaming is precisely and accurately controlled is not entirely prevented.

An object of the present invention is to provide such a tunnel oven-broiler of broiling wherein greasy food products can be continuously supplied to and delivered from the oven at relatively high volumes and rates while tunnel entrance and exit openings remain open at all times during the cooking process.

A further object of the invention is the provision of such a tunnel oven-broiler of broiling wherein the constant broiling of food products, particularly greasy meat items, does not produce objectionable buildup or saturation of the atmosphere within the oven which otherwise could condense on the surfaces of these items and impart undesirable taste to the cooked product.

It is an object of the present invention to provide such a tunnel oven and method of broiling which avoids loss of temperature control within the oven during cooking which otherwise occurs in chambers resulting from flaring and flaming; it being a related object also to provide such an oven in which temperatures of cooking surfaces within the oven are precisely and accurately controlled to provide even, complete and precise cooking of the product.

A related object of the present invention is to provide such a tunnel oven-broiler in which the temperature of the surface within the tunnel which emit infrared radiation for heating are quickly and accurately sensed to promote rapid, precise response by heating elements to promote consistency of broiling for more uniform and more reproducible broiling of food products.

Another object of the invention is the provision of such a tunnel oven-broiler which not only is self-cleaning within the oven chamber but also provides for self-cleaning of the conveyor, drive elements and other structure associated with the oven chamber which may become coated with food or grease during use.

Among still other objects of the present invention include the provision of such a tunnel oven-broiler which can be relatively economically and simply manufactured, which is reliable and of an extremely durable, longlasting configuration, and which is very well suited for heavy duty, high-volume commercial usage.

It is also an object of this invention to provide an oven-broiler which by its humpback configuration avoids wasteful escape of thermal energy, providing a dramatic increase of efficiency.

Another object of the invention is to provide an oven-broiler cooking which allows relatively less skilled personnel to carry out broiling more accurately and to a greater degree of uniformity of result than has heretofore been possible.

Other objects and features of the invention are in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figures 1, 2:
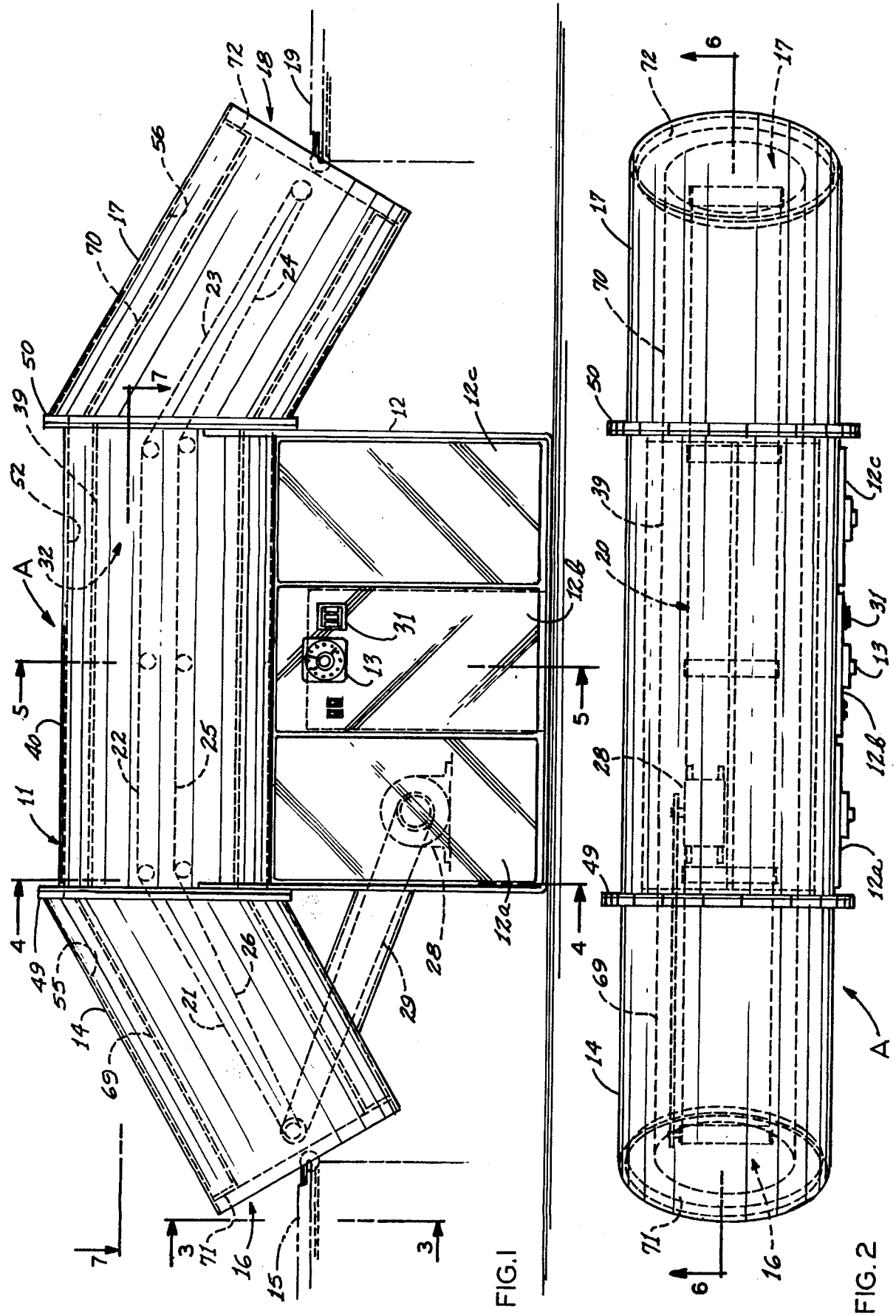
FIG. 1 is a side elevation view of a so-called humpback tunnel oven-broiler constructed in accordance with and embodying the present invention.
FIG. 2 is a top plan view of the oven-broiler embodiment of FIG. 1.

Referring now by reference characters to the drawings, and particularly to FIGS. 1 and 2, designated generally at A is an embodiment of an oven-broiler of the invention which is of the so-called humpback type. The oven-broiler is intended primarily for the broiling of food products, such as steaks, chops and other cuts of meats whether beef, pork, lamb, fowl or other meat, which renders grease during cooking. Typical of these kinds of foods are beef steaks and hamburgers which contain by volume a substantial percentage of fat which, upon heating, is rendered and drips from the meat and tends to flare up and char, ordinarily producing flame when exposed to temperatures sufficient for broiling.

For convenience, this new tunnel oven-broiler may be referred to as simply a broiler. Broiler A includes a central section or unit 11 of generally horizontal disposition seated upon a base 12 having three compartmental sections 12a, 12b and 12c, one of which may contain temperature controls, as at 13, for controlling one or more electric heaters contained within section 11 for providing heating of the interior surfaces of the oven for direct emission from said surfaces of infrared radiant energy from the large cross sectional surface area thus provided for direct absorption by food products being conveyed through the oven. Extending from the left side of central portion 11 is an angled end portion 14 through which food products are delivered to the oven, as by an auxiliary conveyor 15, through an opening 16 which remains open at all times during cooking of the food products whereby steaks, chops, hamburger patties, etc. may be continuously fed to broiler A.

Similarly, a right end section 17 slopes downwardly from central portion 11 for continuous delivery of the cooked food products through an opening 18 which also remains open at all times during the cooking process. The cooked articles are thus provided through opening 18 for delivery to a serve station or another auxiliary conveyor 19.

Figures 6, 7, 8:
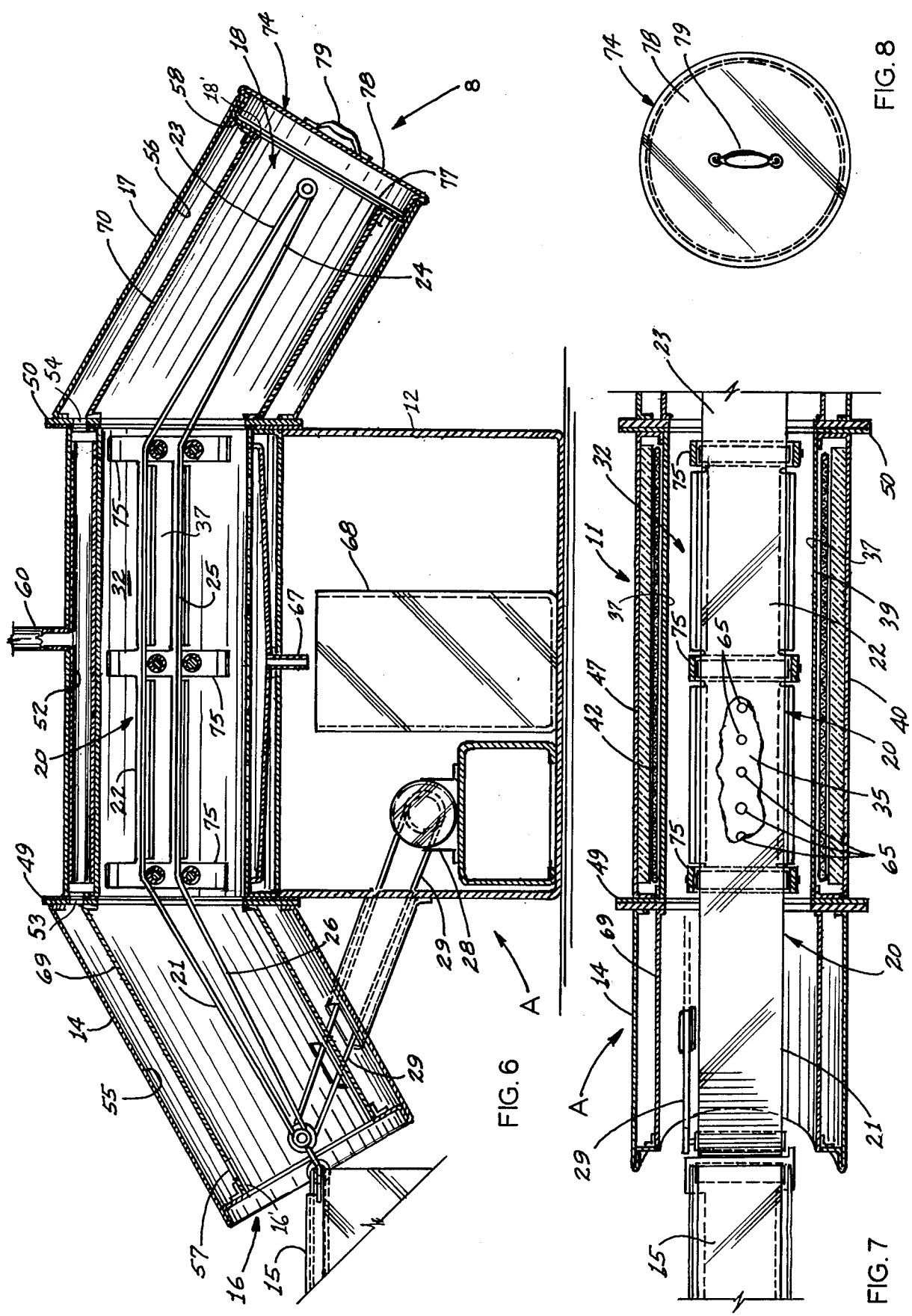
FIG. 6 is a vertical cross-section taken generally along line 6—6 of FIG. 2.
FIG. 7 is a fragmentary longitudinal cross-section taken generally along line 7—7 of FIG. 1.
FIG. 8 is a plan view of a certain cover or plug for closure of the tunnel oven-broiler under certain conditions.

Referring now also to FIG. 6, there is shown with oven A a continuous conveyor 20 having a first inclined reach 21, a horizontal reach 22 and a further inclined reach 23, and with return reaches being indicated at 24, 25 and 26. Conveyor 20 is driven by a suitable drive mechanism 28 via a drive chain 29. Conveyor 20 may be driven at a suitable speed for conveying steaks through the oven chamber in a desired interval of time whereby a steak, for example, may be cooked well done, rare, etc., according to the appropriate interval of time. Drive mechanism 28 preferably may be a DC motor type adapted to be driven by circuitry as described in co-assigned U.S. Pat. No. 4,152,631 of Dennis M. Weinberg et al entitled "Process Control System" which permits selection of a predetermined interval of time in minutes and tenths of seconds which will be required for a food product to completely traverse the length of the oven from entrance to exit, as selected by the user by thumb wheel controls 31 or the like.

As used for the broiling of steaks, chops or other cuts of meat, the food products may preferably be applied directly to the surface of conveyor reach 21 through entrance 16 without the use of plates, trays, or other dishes, adhering to the conveyor by friction and being carried up the inclined reach 20 and thus into the central unit 11 for horizontal transportation on reach 22 and then is carried downwardly upon reach 23, having been cooked. To provide additional gripping of the food products by the inclined reach 21, as the products enter the broiler, conveyor 20 may be of chain or metal bar link belt type for providing projections, ribs or other means for engaging the food products. However, it is within the purview of the invention to provide alternative conveyor belt arrangements which can carry trays, pans or other supporting receptacles, for the food products.

In accordance with the invention, the central oven chamber 33 is oriented with respect to entrance 16 and exit 18 so that the highest points 16', 18' of both the entrance and exit is no higher, and preferably lower, than the floor 35 of chamber 32 whereby there will be trapped within chamber 32 a substantial quiescent, oxygen-starved tunnel atmosphere which tends to become heated because of the lack of movement of the air and such will introduce a slight overpressure as the trapped gases tend to rise, as in a hot air balloon, being thus effectively trapped within chamber 32 except to the extent they are vented as described hereinbelow. However, it is to be emphasized that cooking of infrared radiant energy from the surfaces of chamber 32 and such radiation is emitted not only by floor 35 but also by the ceiling 36 and walls, as at 37, of chamber 32.

For this purpose, a center section is of double wall construction being defined by an inner tubular member 39 and an outer tubular member 40. Between the inner and outer walls thus provided are located electric heating units, as at 42, which are preferably curved to conform to the outside surface of tubular length 39 for direct transference of heat thereto. Each of these infrared heater panels or units 42 may be of the form disclosed in Wells U.S. Pat. No. 3,809,859.

Although separate upper and lower panels could be utilized (being individually controllable, if desired, for maintaining a predetermined temperature differential between the floor 35 and ceiling 36 of chamber 32), the preferred embodiment illustrated has two such panels 42 which extend around the sides of the oven, both being controlled by temperature control 13 without providing a temperature differential between the floor 35 and ceiling 36.

In accordance with the invention, a precision thermocouple probe 44 penetrates the outer tubular member 40 and extends to a point of contact 46 against the outer surface of tubular length 39 whereby it will accurately sense the actual temperature of the tubular member 39 which serves as the source of infrared energy. In this way, probe 44 will measure the actual infrared emission temperature rather than the temperature of the heater panels or units 42. Probe 44 is interconnected with control 13, which is of commercially available anticipatory proportional type, to permit cycling on and off of heaters 42 for maintaining the temperature of the tubular member 39 precisely at the desired temperature for broiling, e.g., 1000° F. If desired, probe 44 may be urged toward member 39 by the use of spring pressure so that intimate thermal contact is always ensured at point 46 with the outer surface of member 39.

Figure 5:
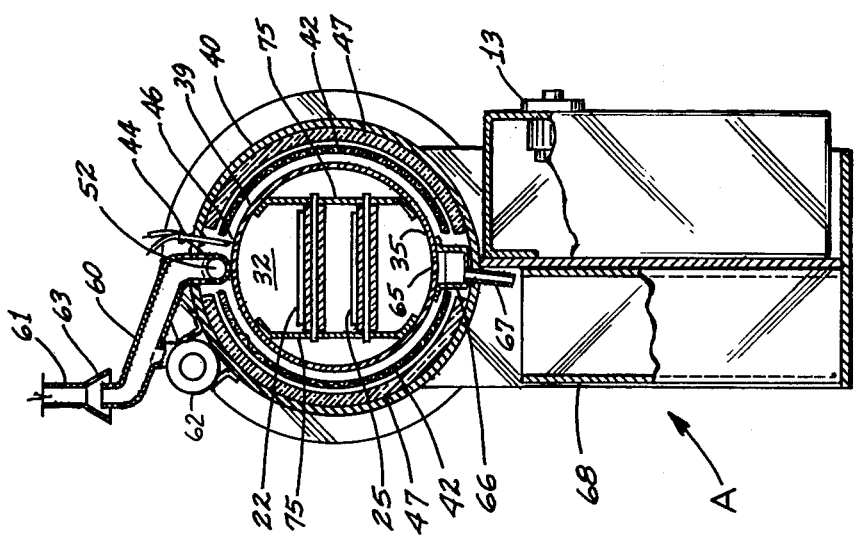
FIG. 5 is a similar transverse cross-section taken generally along line 5—5 of FIG. 1 with certain structure broken away.
Figure 4:
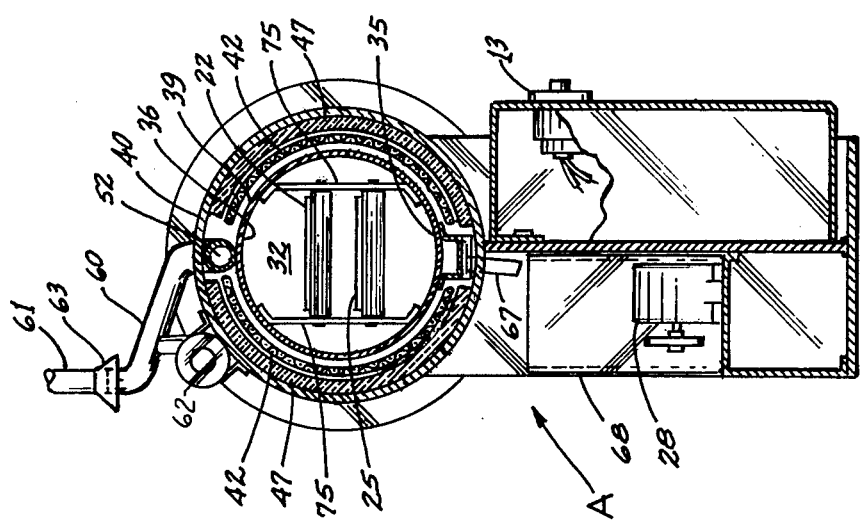
FIG. 4 is a transverse cross-section taken generally along line 4—4 of FIG. 1.
Figure 3:
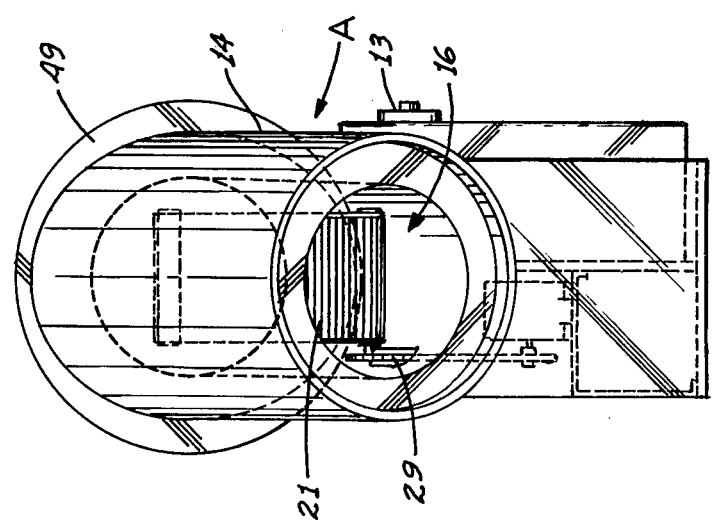
FIG. 3 is a left end elevation view of the oven-broiler of FIG. 1.

Surrounding the heaters 42, refractory material 47 provides insulation between the heaters 42 and outer tubular member 40 to maintain outer surfaces thereof reasonably cool to the touch. As will be apparent in FIGS. 4 and 5, the tubular members 39, 40 are of circular cross section whereby they will be provided an even distribution of thermal stresses within these members during use of the oven to prevent distortion, buckling or the like. Similarly, end sections 14 and 17 are each constructed of tubular lengths of material or circular section to provide a double walled construction. The two end sections 14, 17 are bolted to central section 11 at flanges 49, 50 although alternatively the entire broiler may be a continuous welded construction whereby the end sections 14, 17 are integrally formed and merge into the central section 11. It is also within the scope of the invention to provide for multiple central sections 11 which may be mated together by bolting or securement at flanges to provide an oven or broiler of desired length and to which the end sections 14, 17 may be fitted. Such a construction may be easily disassembled for cleaning.

Extending along the length of central section 11 between the inner and outer tubular members 39, 40, is a tubular vent conduit 52 which communicates through openings 53, 54 in the respective flanges 49, 50 to corresponding vent conduits 55, 56 in sections 14, 17. The outer ends of conduits 55, 56 open, as at 57, 58, respectively, proximate the highest points 16', 18' of the entrance and exit 16, 18 whereby the atmosphere within the broiler may be selectively vented through these openings 57, 58 in accordance with the invention to precisely control the quality and oxygen content of the atmosphere within the broiler. For venting purposes, a vent tube 60 extends upwardly from the central portion of conduit 52 and in turn communicates with an exhaust duct 61 through which air may be forced by a blower 62 through a flue 63 which permits air to be drawn also from outside the broiler and thus forced upwardly through duct 21 to enhance the draft.

Referring to FIG. 7, floor 35 of the broiler chamber is provided with a series of apertures 65 along its length which open into a drain 66 having a sloped configuration to permit drainage through a drain pipe 67 into a container 68. Alternatively, apertures 65 may be replaced by one or more slots or by a continuous opening along the length of the inner tubular member 39 whereby greases, fat and liquid produced during broiling is permitted to drain from member 39 and removed from chamber 32 before flames or flare ups from the high temperatures of the chamber surfaces. The number of spacing of the apertures 65 may vary according to the designed broiling capacity, broiling mode, and type of meat product anticipated for broiler A. Because of the circular cross section of member 39, grease and other flammable liquids produced by heating of the food products during the broiling process drain down the inside of tubular member 39 toward the recesses 65 and are for the most part removed before they can contribute substantially to the production of flame or flaring within chamber 32.

Smoke produced during broiling will be entrapped within chamber 32 but is selectively drawn off through vent 60. In this regard, blower 62 need not be continuously operated, although such may be desirable under such circumstances, but instead may be used in a selective manner to purge the trapped atmosphere of smoke should such become excessive. Also, it is within the scope of the invention to provide a valve (not shown) in vent 60 so that a desired degree of control can be maintained over the amount of gases, smoke, vapor, etc. withdrawn from chamber 32 through openings 57, 58. Although not shown, openings may also be provided through ceiling 36 of chamber 32 into duct 52 and such may be spaced at intervals along floor 35 like apertures 65.

Referring to FIG. 6, it will be apparent that the end sections 14, 17 are angled sufficiently downward so that the respective conveyor reaches 21, 23 therein form a substantial angle with the horizontal and such is the generally preferred range of 25°–45°, and most preferably 35°–40°, it having been found that the angle must be sufficiently great so that the highest points 16', 18' of the entrance and exit are below the floor 35 of chamber 32 yet the conveyor angle is not so great that food products will not be carried reliably up into chamber 32 and down again after cooking. The steep angle thus provided allows reliable trapping of the quiescent, oxygen-starved environment in chamber 32 while also permitting rapid entry and removal of food products from chamber 32. Although not shown, provision can be made for drainage of any grease or fluids which may be present within the end sections 14, 17 but little heating takes place therein so that any production of grease or liquids is minimal in any event.

End sections 14, 17 have respective inner tubular members 69, 70 which preferably are of stainless steel, like tubular members 39, for complementary thermal characteristics, durability, corrosion resistance and for ease of cleaning and freedom from corrosion. These and other members of the oven may alternatively be constructed of various other steels, alloys, ceramics, or ceramic-coated metals, as well as aluminized steel. The outer extremities of these tubular members terminate short of the outer ends of the respective end sections 14, 17 to provide respective recesses 71, 72 to permit the receipt of plugs, such as that designated generally at 74 in FIG. 8 at each end of the broiler. When closed by such plugs 74, the temperature of the atmosphere in chamber 32 can be increased greatly to produce self-cleaning of all surfaces in the oven, including the various reaches of conveyor 20 as well as the support structure 75 for the conveyor, as pyrolysis of grease, food particles, etc. occurs, leaving only a negligible ashy residue. Each such plug 74 may be of double walled construction to provide an inner plate 77 and an outer wall 78 to which handle 79 may be secured for convenient removal and handling of each such plug 74.

The preferred construction may be referred to as a muffle type of arrangement wherein the tubular inner chamber can be heated to temperature far higher than heretofore used in tunnel ovens of the type employing infrared heating.

Generally, operation of broiler A provides for an extremely efficient method of tunnel oven broiling which may be characterized as flame-controlled since the flaming and flaring conventionally associated with broilers including previous tunnel oven broilers in substantially avoided and only slight or occasional flaming permitted even though steaks, chops or other greasy meats or other food products of usually flame-producing character otherwise would produce flaming and flaring when exposed to the high temperatures which can be utilized in the present oven. However, this tendency for food products or grease to burst into flame is well suppressed, and, therefore, by the entrapped oxygen-starved atmosphere within chamber 32 which, because of the heating, will produce a slight overpressure tending to maintain therein what is, in effect, a bubble of air.

The entrance 16 and exit 18 are maintained open at all times during cooking while food products are carried quickly upward into the entrapped oven atmosphere. As they are carried along the length of chamber 32, they are broiled by the absorption of infrared radiant energy emitted from the surfaces of inner tubular member 39. Conveyor 22 is operated in a continuous manner at the desired speed for conveying the products through the oven in a preselected time interval. After broiling, the food products are carried downwardly out of the entrapped broiler atmosphere for delivery through exit 18. During cooking, and as the food products are continuously supplied to the oven (as will be expected in fast food service operations), gases are selectively vented from chamber 32 through vent passage or ducts 52, 55 and 56 for removal through duct 61 as necessary to maintain a proper oxygen-starved gas balance of smoke content within chamber 32. Also, grease and liquids produced by heating of the food products are drained through openings or apertures 65.

It has been found that it is inconsistent with maintaining thermostatic control of the infrared emission temperatures within the broiler if flaming is permitted to proceed freely since the open flames or flaring would tend to cause heating of the surfaces of tubular member 39 independent of the operation of heating elements 42. If this flaming or flaring were not controlled, the lack of temperature control by means of elements 42 could permit combustion to become self-sustaining since the combustion would be dependent not upon the electrical produced thermal input but rather upon the type of meat, fat content and other factors over which the user either has no ready control or does not desire to control. If thermostatic control were thus lost, the temperature within the oven could fluctuate wildly producing unacceptable, uneven cooking of the food products, burning, incomplete cooking or variable cooking times, any of which would constitute an unsatisfactory result. Accordingly, at all times during the cooking process, the direct thermal sensing by probe 44 and control 13 maintains the temperatures of the emitting surfaces of member 39 less than a critical combustion temperature at which the tendency of the food products to burn or produce flame, whether directly or indirectly by rendering of grease or vapors, becomes uncontrolled.

On the other hand, broiling preferably does not take place under such conditions that the atmosphere within chamber 32 is permitted to become supersaturated with smoke or vapors which would be produced if an entirely flame-suppressed condition were maintained since such would result in undesirable condensation on the food products of the smoke, vapors, etc. which would thus result. For these reasons, the emission temperature sensed by probe 44 is increased desirably to a level at which there will be a slight tendency for flickering or flaming to be produced. This may be characterized as incipient flaming or burning but will not be recognized as resulting in undesirable substantial direct impingement of flame upon meat products as would occur using charcoal, for example, where large sheets of flame frequently leap from and lick the meat products.

In using the new oven, one may increase the infrared emission temperature to some value less than the predetermined critical temperature at which the food product or greases produced during heating will burn or produce uncontrolled flaming or flaring. This critical temperature will depend on the type of food product, amount of fat contained therein and cut of meat, etc., which factors can be established in advance for the type of food product and rate of delivery to chamber 32. More preferably, however, it is preferred to broil with the new oven so that the infrared emission temperature, as controlled by probe 44 which causes temperature control device 13 to selectively energize or de-energize the heater elements 42 in a proportional cycled on-cycled off manner to maintain a desired temperature set point, which the user selects at the front panel of control 13, will not vary more than 30° F. from the set point. For example, as an illustration, the set point temperature selected may be 1035° F. In this case, the permissible actual emission temperature could vary from 1005° F. to 1065° F. If it should exceed this value, as indicated by the temperature measurement function of control 13 (which is preferably of the type having a separate needle indicator which displays actual emission temperature as well as a separate indicator for establishing a set point), the user would select a lower set point for operation of the broiler at which the actual emission temperature would not vary from the set point temperature by more than ±30° F. In this way, broiling may be carried out at the maximum permissible emission temperature which will avoid thermal instability and loss of thermostatic control. It is emphasized that this is the emission temperature as directly sensed by probe 44, rather than the temperature of the atmosphere within chamber 32. That atmosphere temperature will be considerably less, it being desired only to maintain a relatively quiescent, oxygen-starved atmosphere which denies oxygen for combustion of the food product or vapor or liquid constituents released by the food product during broiling.

Broadly, broilers of the present invention may utilize infrared emission temperatures ranging from 200° F. to 1200° F. and at the upper ends of this temperature spectrum broiling is provided at temperatures far higher than heretofore conventional in the fast food industry. At these high temperatures, meat products will be desirably altered in color and texture to provide the desirable browning and rich, dark surface coloration which is sought in the restaurant business. Moreover, since the entirety of conveyor 20 is enclosed within the oven and will, in the course of operating, expose all portions of the conveyor to the high radiant temperatures within chamber 32, the metal bar link type of conveyor will cause a very desirable branding effect upon meat products, creating a link pattern of sear marks across the surface of the meat suggestive of the meat having been grilled. This effect is enhanced by the high temperature of conveyor reach 22 as it traverses the length of chamber 32. During self-cleaning, the emission temperature is set to a value of not less than about 700° F., and preferably from 700° to about 1200° F.

Because broiling using the new apparatus involves the heating of food products to temperatures greater than normally utilized for broiling under conditions which deny oxygen so that broiling occurs without substantial flaming or flaring. Thus, the products are broiled without substantial exposure to direct flame and without consequently being burned, charred or carbonized, and so without substantial likelihood for chemical conversion into a carcinogenic form while nevertheless providing a cooked product which is very appetizing in appearance.

The construction of a broiler of the invention allows the various heating and electrical components and connections to be sealed within the inner and outer tubular members which form the individual sections 11, 14 and 17 and thereby provide completely closed, secure surface, both interiorly and exteriorly of the broiler. Because of this, the new broiler is readily hosed, sprayed or otherwise cleaned without introduction of moisture to the electrical components as by directing a water spray including a detergent, antiseptic and so forth into or over the oven as is sometimes preferred in food processing operations. The intrinsic cleanliness of the new broiler makes it, accordingly, particularly useful for aseptic food processing.

From the foregoing, it will be seen that the present oven-broiler can be advantageously self-cleaning. Generally, the self-cleaning is caused or carried out by trapping within the oven chamber a heated atmosphere not less than about 700° F. and this is carried out by heating the walls of the tubular inner member 39 to an infrared emission temperature of not less than about 700° F. Preferably, this heating is produced by plugging the entrance and exit, as described above, while wall heating is maintained. During the self-cleaning mode of operation, each plug 74 effectively closes the respective vent openings 57, 58 within recesses 71, 72 to present any escape of air from chamber 32 so that the atmosphere therein is quickly raised to the very high temperatures necessary for self-cleaning. This high temperature of the atmosphere also causes self-cleaning within end sections 14, 17 while heating all portions of conveyor 20 and other structure within the oven-broiler which would not be heated adequately for self-cleaning by infrared emission from the inner surfaces of tubular member 39.

Accordingly, it is seen that the various objects of the invention are attained and other advantageous results are achieved by the invention.

Although the foregoing includes a description of the best mode contemplated for carrying out the invention, various modifications are contemplated.

Since various modifications can be made in the constructions herein described and illustrated without departing from the scope of the invention, it is intended that all matter contained in the foregoing description or shown in the accompanying drawings shall be interpreted as illustrative rather than limiting.

What is claimed is:

1. A tunnel oven-broiler for flame-controlled tunnel oven broiling of food products of ordinarily flame-producing character such as steaks, chops or other greasy meats prone to burn or produce flame, said oven-broiler comprising a tubular, tunnel-form heating chamber and a conveyor therein for broiling of said food products by infrared heating, means for heating surfaces of said chamber for emission of energy into said chamber for absorption by said food products characterized by means for defining an open entrance and open exit at opposite ends of said chamber such that said entrance and exit are oriented relatively lower than said chamber to entrap within said chamber an oxygen-starved atmosphere having a slight overpressure for suppressing flaming or flaring during broiling of said food products, venting means for selectively venting said atmosphere for control of said atmosphere, means for removing from said chamber grease and other flammable liquids produced by heating of said food products, means for directly sensing the emission temperature of the heated surfaces of said chamber, and control means for controlling said heating means to maintain said emission temperature substantially at a predetermined level, said venting means providing venting from said atmosphere at opposite ends of said chamber proximate the highest points of said entrance and exit, respectively, and tubular inner and outer members, said inner members defining said chamber, and tubular end sections interconnected with said inner member to provide said means defining said entrance and exit.

2. A tunnel oven-broiler according to claim 1 and further characterized by said venting means comprising vent conduits respectively associated with each of said tubular end sections for providing communication between an exhaust duct and outer ends of said end sections.

3. A tunnel oven-broiler according to claim 1 and further characterized by said venting means comprising a vent conduit located between said inner and outer members and extending lengthwise of said oven-broiler between said entrance and exit.

4. A tunnel oven-broiler according to claim 3 and further characterized by said chamber being constituted by a horizontal length of tubular material, said drain outlet means comprising a plurality of drain openings spaced at intervals along the length of said tubular material at the lowest point therein, and drain means below said drain openings for receiving grease and other liquids therein to remove same from said chamber before combustion.

5. A tunnel oven-broiler according to claim 1 and further characterized by said means for removing grease and other flammable liquids comprising drain outlet means extending along a floor of said chamber.

6. A tunnel oven-broiler according to claim 1 and further characterized by tubular inner and outer members, said inner member being located within said outer member to define a double-walled construction providing an annular space around said inner member, said heating means comprising heating panels within said annular space and surrounding said inner member for providing heating of the walls of said inner member for direct emission of energy into said chamber.

7. A tunnel oven-broiler according to claim 6 and further characterized by said heating panels being electrically energizable, said control means controlling the provision of electrical energy to said heating panels by proportional on-off cycling to maintain said emission temperature substantially at said predetermined level, said sensing means comprising at least one temperature sensing probe maintained in direct, intimate thermal contact with the wall of said inner member.

8. A tunnel oven-broiler for flame-controlled tunnel oven broiling of food products of ordinarily flame-producing character such as steaks, chops or other greasy meats prone to burn or produce flame, said oven-broiler comprising a tubular, tunnel-form heating chamber and a conveyor therein for broiling of said food products by infrared heating, means for heating surfaces of said chamber for emission of energy into said chamber for absorption by said food products characterized by means for defining an open entrance and open exit at opposite ends of said chamber such that said entrance and exit are oriented relatively lower than said chamber to entrap within said chamber an oxygen-starved atmosphere having a slight overpressure for suppressing flaming or flaring during broiling of said food products, means for selectively venting said atmosphere for control of said atmosphere, means for removing from said chamber grease and other flammable liquids produced by heating of said food products means for directly sensing the emission temperature of the heated surfaces of said chamber, and control means for controlling said heating means to maintain said emission temperature substantially at a predetermined level, a central section defining said tubular chamber and downwardly angled end sections extending from opposite ends of said central section, said conveyor having a horizontal reach within said central section and inclined reaches within the respective end sections, said inclined reaches defining an angle relative to horizontal within the range of 25°–45°, said end sections each being defined by tubular inner and outer members to provide double-walled construction of each end section.

9. A tunnel oven-broiler according to claim 8 and further characterized by the highest portions of said entrance and exit located at or below the lowest point in said chamber.

10. A tunnel oven-broiler according to claim 8 and further characterized by the outer end of each end section inner member terminating short of the outer end of each end section outer member to define a recess, said conveyor inclined reaches terminating within the respective end sections short of the end section recesses, said oven-broiler further comprising plug means for selective placement in the respective end section recesses for closing said oven-broiler to provide self-cleaning therein.

11. A tunnel oven-broiler according to claim 10 and further characterized by said venting means providing venting from said chamber atmosphere at opposite ends of said chamber through vent openings which open into the respective recesses, said plug means closing said vent openings to prevent venting therethrough when self-cleaning of said oven occurs.

* * * * *